US008042127B2

(12) United States Patent  (10) Patent No.: US 8,042,127 B2
Chen  (45) Date of Patent: Oct. 18, 2011

(54) OPTICAL DISK PLAYER CAPABLE OF MONITORING THE OPTICAL DISK STATUS

(75) Inventor: Yung Ta Chen, Guangdong (CN)

(73) Assignee: Valley Wood Electrical (Shenzhen) Co., Ltd., Guangdong (CN)

( * ) Notice: Subject to any disclaimer, the term of this patent is extended or adjusted under 35 U.S.C. 154(b) by 320 days.

(21) Appl. No.: 12/488,697

(22) Filed: Jun. 22, 2009

(65) Prior Publication Data

US 2009/0282426 A1  Nov. 12, 2009

(30) Foreign Application Priority Data

Dec. 5, 2008  (CN) .......................... 2008 1 0218111

(51) Int. Cl.
  *G11B 17/04* (2006.01)
(52) U.S. Cl. ....................................................... 720/623
(58) Field of Classification Search .................. 720/623
  See application file for complete search history.

(56) References Cited

U.S. PATENT DOCUMENTS 7,107,598 B2 * 9/2006 Ito ................................. 720/623
7,356,825 B2 * 4/2008 Makisaka et al. ............. 720/626
7,565,666 B2 * 7/2009 Fujimoto et al. .............. 720/623
7,793,314 B2 * 9/2010 Yamamoto et al. ............ 720/623
7,814,508 B2 * 10/2010 Fujisawa ....................... 720/713

* cited by examiner

*Primary Examiner* — Mark Blouin
(74) *Attorney, Agent, or Firm* — Jackson IPG PLLC; Demian K. Jackson

(57) ABSTRACT

An optical disk player, which comprises: a shell, a plummer fixed in the shell, an optical disk transport mechanism, a guiding mechanism, an optical disk loading final position detection mechanism, and a control part; the shell is 80-90 millimeters wide at the optical disk insertion direction; the detection parts of the guiding mechanism are located between the plummer and the delivery roll of the transport mechanism; the optical disk loading final position detection mechanism comprises a support part and a trigger bar; one end of the support part is rotatablely fixed to the upper base plate near the detection part of one detection bar, and its middle is provided with an assorted part interacting with the detection bar; the middle of the trigger bar is rotatablely fixed to the free end of the support part, of which one end is provided with a contact part for contacting the periphery of an optical disk, and the other end is connected to the control part. When an optical disk is at the playing position, a part of the optical disk will be exposed out of the shell of the optical disk player, so, when the optical disk is played, the status of the optical disk in the optical disk player can be intuitively seen from the outside.

20 Claims, 13 Drawing Sheets

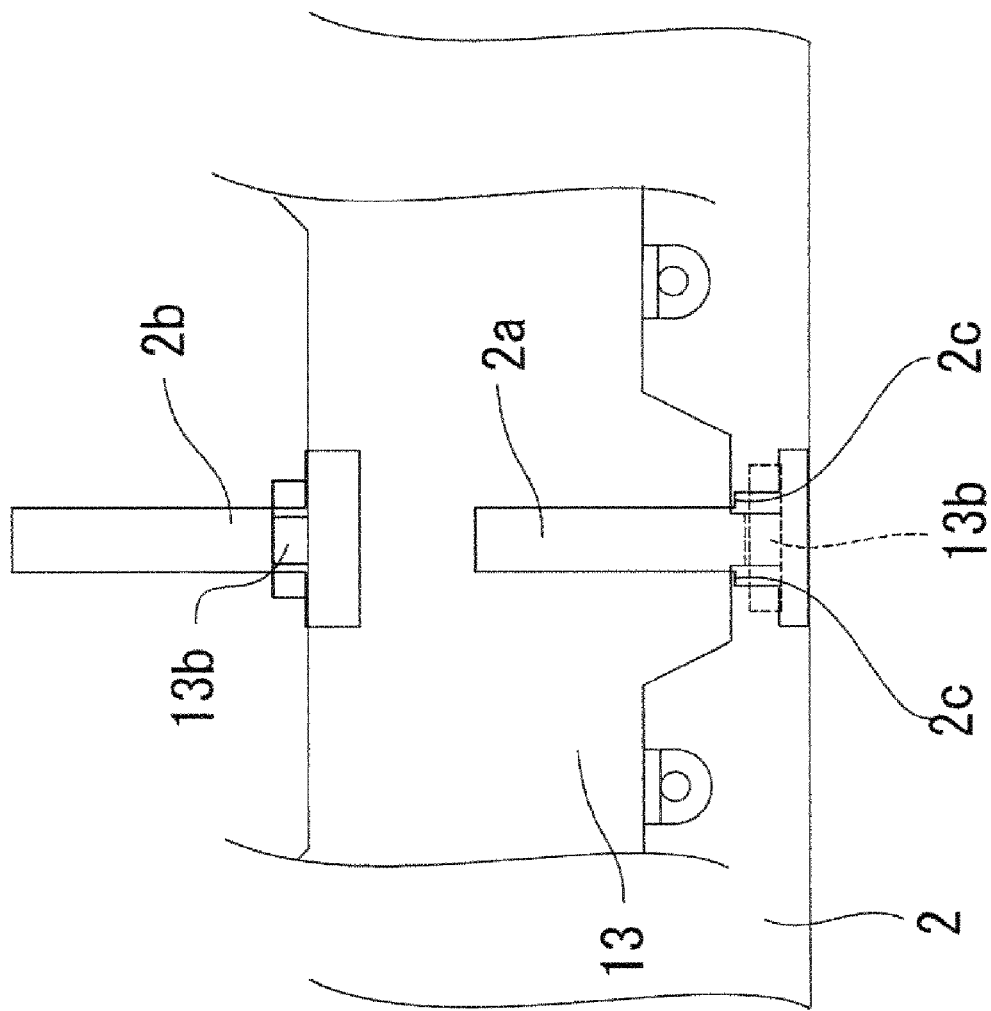

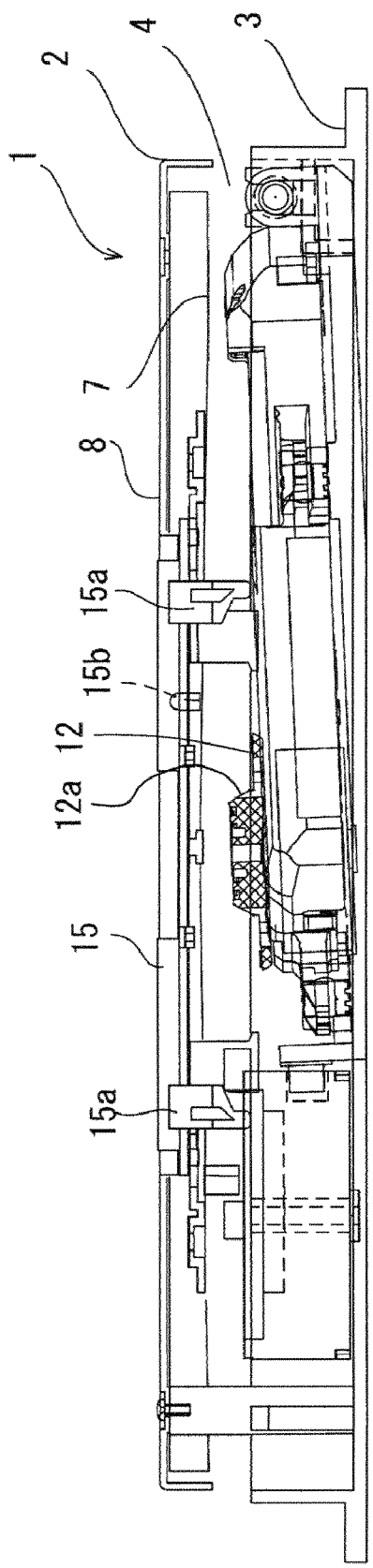
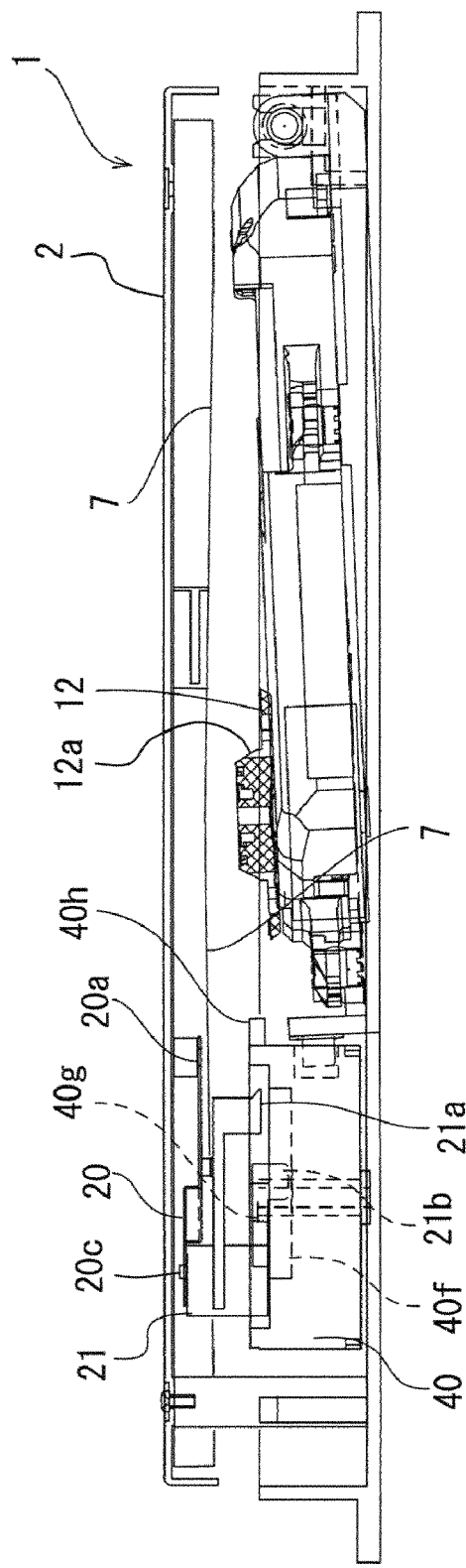

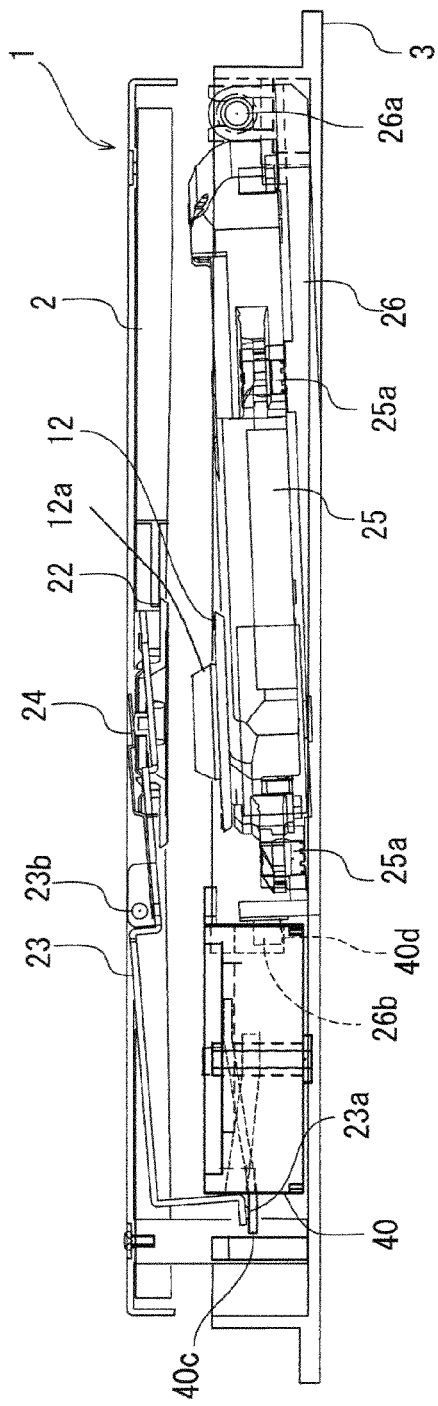
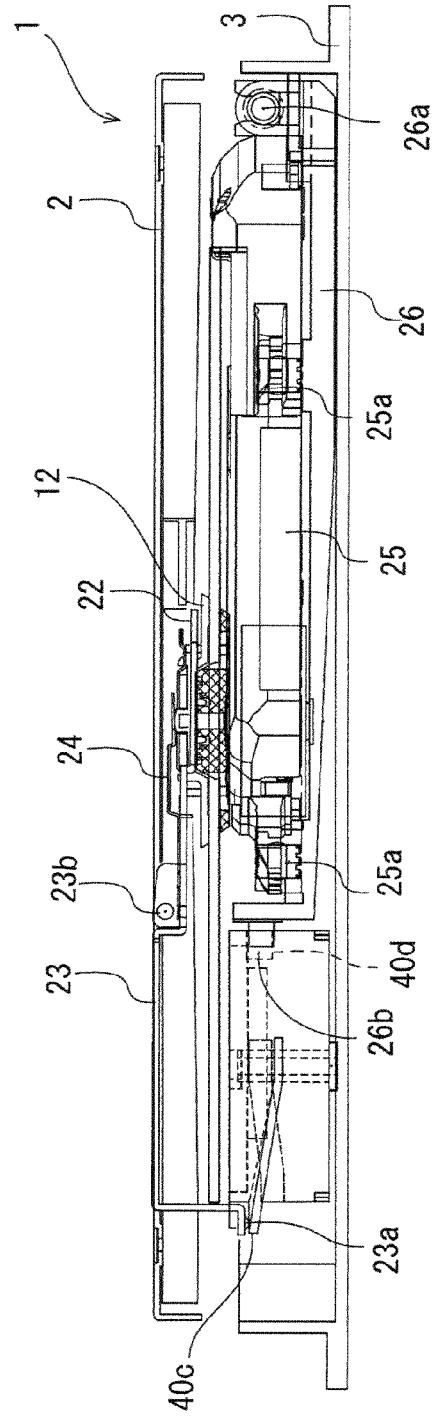

US 8,042,127 B2

OPTICAL DISK PLAYER CAPABLE OF MONITORING THE OPTICAL DISK STATUS

BACKGROUND OF THE INVENTION

1. Field of the Invention

The present invention involves an optical disk player especially involves an optical disk player that transports the optical disk inserted from the insertion inlet to the playing position via a delivery roll.

2. Description of the Related Art

In an existing optical disk player, when the optical disk gets to the playing position, the whole optical disk is entirely contained in the player, and the status of the optical disk being played can not be seen from the outside. Especially for that kind of optical disk players which transports the optical disk to the playing position via a delivery roll, for the internal structure is complicated, the shell of the optical disk player can not be made less than the outer diameter of the optical disk. For example, a Japanese patent application with the publication number of 2008-135106 (P2008-135106A) disclosed such an optical disk playing device.

SUMMARY OF THE INVENTION

The technical problem of the present invention to solve is to provide an optical disk player, in which while an optical disk is played, the status of the optical disk in the optical disk player can be seen from the outside.

To solve the above mentioned technical problems, the optical disk player of the present invention comprises: a shell, a plummer fixed in the shell, a transport mechanism for transporting the optical disk between the optical disk insertion inlet and the plummer, a guiding mechanism for guiding the optical disk to the center of the transport path, an optical disk loading final position detection mechanism, and a control part for controlling a chuck plate to keep the optical disk on the plummer and canceling the holding of the transport mechanism to the optical disk when an optical disk being transported to be above the plummer, characterized in that:

the shell is composed of an upper base plate and a lower base plate, and a clearance used as the optical disk transport path is located between the upper base plate and the lower base plate; one end of the clearance is the optical disk insertion inlet, and the upper and the lower base plates are 80-90 millimeters wide at the optical disk insertion direction;

the guiding mechanism comprises a pair of detection bars that are symmetrically located at the two sides of the central line of the optical disk transport path and capable of rotating around respective rotary pivots, a linkage plate for making the pair of detection bars to move together, and a first stretching spring making the detection bars to rotate according to the direction that makes their detection parts to contact the periphery of the optical disk, wherein, the detection parts of the pair of detection bars are located between the plummer and the delivery roll of the transport mechanism;

the optical disk loading final position detection mechanism comprises a support part and a trigger bar; one end of the support part is rotatablely fixed to the upper base plate near the detection part of one detection bar, and its middle is provided with an assorted part interacting with the detection bar; the middle of the trigger bar is rotatablely fixed to the free end of the support part, of which one end is provided with a contact part for contacting the periphery of an optical disk, and the other end is connected to the control part.

For the shell of the optical disk player of the present invention is only 80-90 millimeters wide at the optical disk insertion direction, which is much less than the optical disk outer diameter of 120 millimeters, when an optical disk is at the playing position in the optical disk player of the present invention, a part of the optical disk will be exposed out of the shell of the optical disk player, so, when the optical disk is played, the status of the optical disk in the optical disk player can be intuitively seen from the outside.

For the support part and the trigger bar of the optical disk loading final position detection mechanism both adopt rotatable way to be connected, the displacement distance at the optical disk transport direction is effectively reduced, so as to reduce the width of the shell of the optical disk player at the optical disk insertion direction. At the same time, for the detection parts of the guiding mechanism are located between the plummer and the delivery roll, the width of the shell of the optical disk player at the optical disk insertion direction can be further reduced. So, it is ensured that the width of the shell of the optical disk player of the present invention can be made as 80-90 millimeters wide at the optical disk insertion direction.

BRIEF DESCRIPTION OF THE DRAWINGS

FIG. 2 is an enlarged view about the relation of the linkage plate and the upper base plate;

FIG. 3 to FIG. 6 are separately sectional views at different positions of the optical disk player of the present invention, which are at the same direction with the optical disk transport path;

DESCRIPTION OF THE PREFERRED EMBODIMENT

Figure 1:
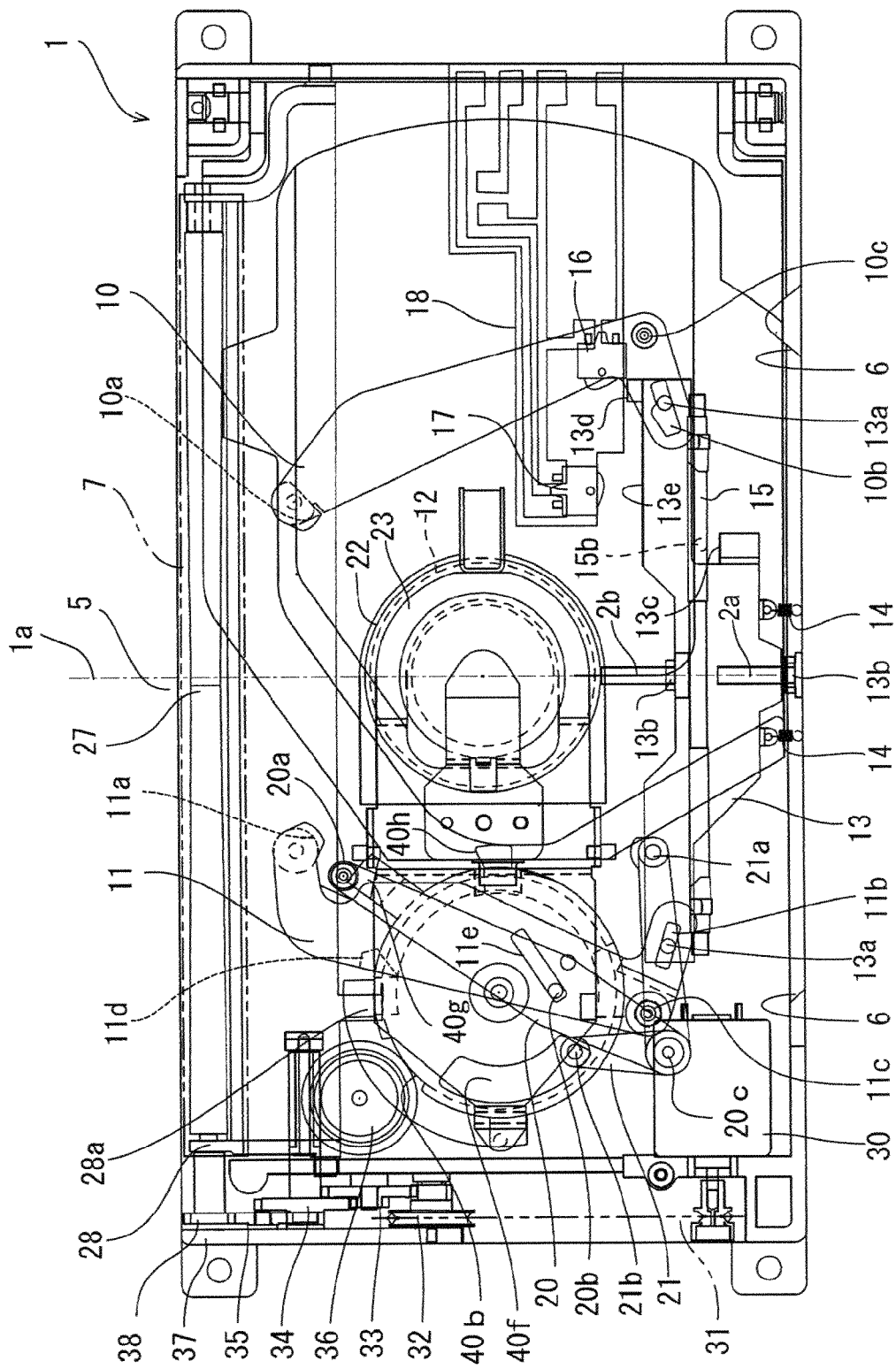
FIG. 1 is a plan view of an optical disk player of the present invention, and in FIG. 1, almost all the components are contained inside the base plates; according to the rules, these components should be described with broken line, but because broken line is not clear enough, so they are described with thin real line.

Aspects of the present invention are best understood from the following detailed description when read with reference to the accompanying figures.

Referring to from FIG. 1 to FIG. 7, the optical disk player comprises: a shell 1, a plummer 12 fixed in the shell, a transport mechanism for transporting the optical disk between the optical disk insertion inlet 5 and the plummer 12, a guiding mechanism for guiding the optical disk to the center of the transport path, an optical disk loading final position detection mechanism, and a control part 40; when an optical disk is transported to be above the plummer 12, the control part 40 controls a chuck plate 22 to keep the optical disk on the plummer 12, and controls the transport mechanism to cancel holding the optical disk.

The shell 1 is composed of an upper base plate 2 and a lower base plate 3, and the upper, lower base plates are connected as one body via connecting components such as screws; a clearance 4 used as the optical disk transport path is located between the upper base plate 2 and the lower base plate 3; one end of the clearance 4 is the optical disk insertion inlet 5, and the shell at the other end is provided with a big diameter optical disk baffle 6; the upper, lower base plate are 84 millimeters wide at the optical disk insertion direction; when an optical disk is at the playing position (that is, on the plummer 12), a part of the optical disk is exposed out of the shell 1, so, the status of the optical disk can be intuitively seen from the outside.

Referring to FIG. 1 and FIG. 2, the guiding mechanism comprises a pair of detection bars 10, 11 capable of rotating around respective rotary pivots 10c, 11c, which are symmetrically located at the two sides of the central line 1a of the optical disk transport path, a linkage plate 13 for controlling the pair of detection bars 10, 11 to move together, and a first stretching spring 14 making the detection bars 10, 11 to rotate according to the direction that makes their detection parts 10a, 11a to contact the periphery of the optical disk.

Wherein, the two detection bars 10, 11 are provided with long arms and short arms, which are of L shape; the front end of the long arms are provided with detection parts 10a, 11a contacting the periphery of the optical disk, and the front end of the short arms are provided with the first slotted holes 10b, 11b; the curved parts of the L shape are the rotary pivots 10c, 11c. The detection parts 10a, 11a of the pair of detection bars 10, 11 are located between the plummer 12 and the delivery roll 27 of the transport mechanism; while being at the initial position, the space between the two detection parts 10a, 11a is a little smaller than the diameter of a small diameter optical disk. A salient foot part 11d is located on the left detection bar 11 towards the lower base plate 3. According to the rotating position, the foot part 11d can selectively mesh with the second salience 40h and the third salience 40g on the cam unit 40 (namely the control part 40), so as to release the contact of the detection parts 10a, 11a and the periphery of the optical disk.

The linkage plate 13 capable of freely moving at the direction parallel to the optical disk transport path is fixed on the upper base plate 2, and the two end parts of the linkage plate 13 are provided with the first saliencies 13a capable of cooperating with the first slotted holes 10b, 11b of the two detection bars 10, 11. Moreover, a first guiding hole 2a and a second guiding hole 2b are located on the upper base plate 2, so as to make the linkage plate 13 to move in parallel according to the optical disk transport path. Embedding parts 13b capable of being separately embedded to the two guiding holes 2a, 2b are located at the central part of the linkage plate 13. Referring to FIG. 2, the width of an end part of the first guiding hole 2a is a little bigger than the width of the embedding part 13b on the linkage plate 13, and step parts 2c are formed at the inner side of the first guiding hole 2a. So, if the linkage plate 13 wants to do initial movement at heeling condition, the embedding parts 13b will contact the step parts 2c, so as to limit the initial movement of the linkage plate 13.

The first stretching spring 14 is located between the linkage plate 13 and the upper base plate 2, stretching the linkage plate 13 to the downward direction in FIG. 1, so, the two detection bars 10, 11 will endure the spring force of the first stretching spring 14 via the linkage plate 13, to make the detection parts 10a, 11a being in the trend of getting closer to each other.

Figure 15:
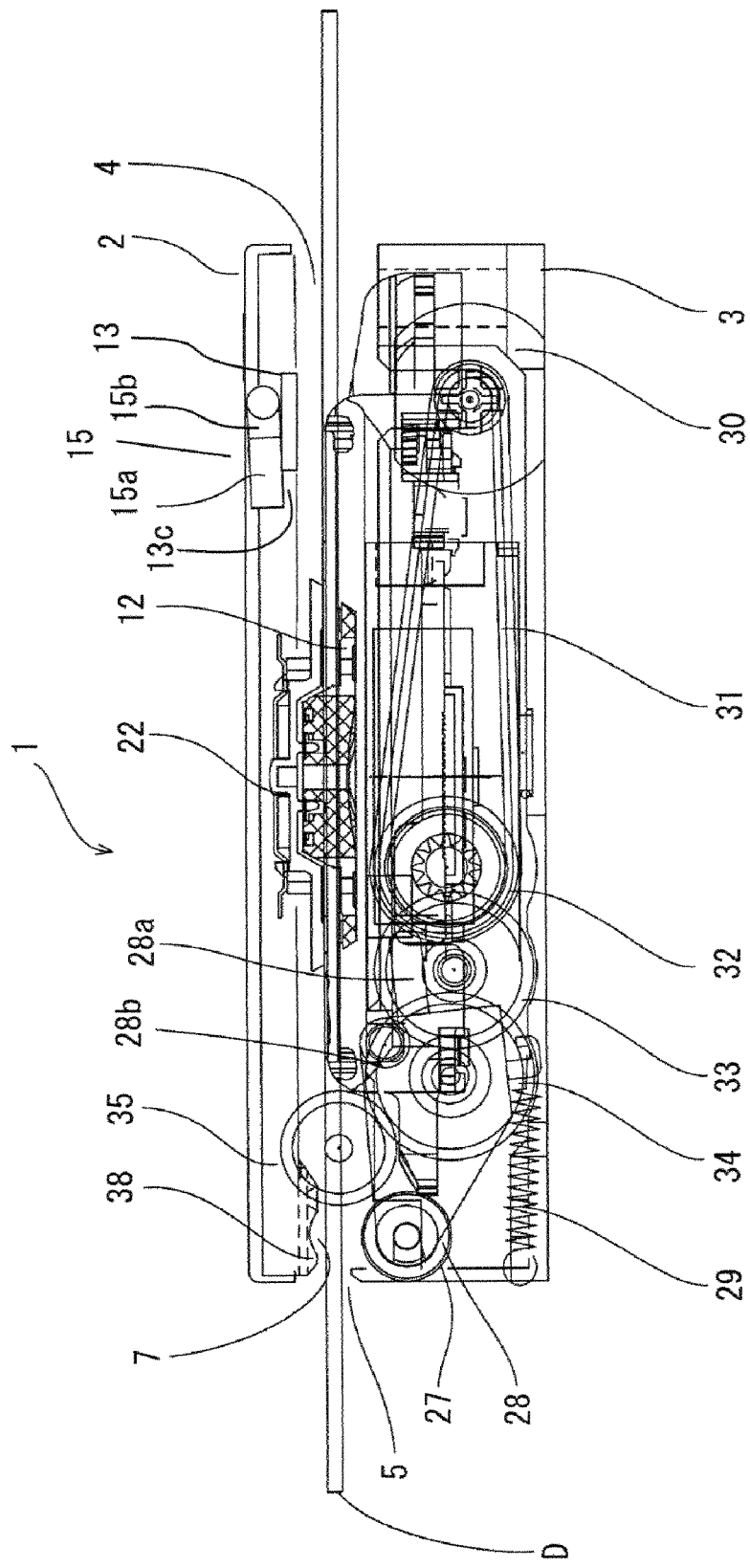
FIG. 15 is a side view of a big diameter optical disk at the state of being played.

Besides, the linkage plate 13 is provided with a first pushing part 13c. When the movement of the linkage plate 13 is bigger than the initial position, as shown in FIG. 15, the first pushing part 13c will mesh with an optical disk baffle 15 that makes the transport of a small diameter optical disk to be at the stop position, so as to make the baffle part 15a of the optical disk baffle 15 to exit from the optical disk transport path 4. The optical disk baffle 15 is a long and thin clubbed part, which is fixed on the upper base plate 2, and is perpendicular to the central line 1a. Referring to FIG. 3, before the optical disk is inserted, the baffle part 15a extends into the optical disk transport path 4. The position of the baffle part 15a is set to make it to contact the periphery of the small diameter optical disk when the center of the small diameter optical disk just passes the center of the plummer a little. Furthermore, a pushed part 15b contacting the first pushing part 13c of the linkage plate 13 is located on the optical disk baffle 15. Besides, the linkage plate 13 is also provided with a second pushing part 13d and a third pushing part 13e; when the linkage plate moves from the initial position, the second pushing part 13d will make a first switch 16 for starting the motor to act, and the third pushing part 13e will make a second switch 17 for judging the outer diameter of the inserted optical disk to act. The first switch 16 and the second switch 17 are fixed on the upper base plate 2 via a printed board 18.

Referring to FIG. 1, the optical disk loading final position detection mechanism comprises a support part 20 and a trigger bar 21; via a first short axis 20a, one end of the support part 20 is fixed on the upper base plate 2 near the detection part 11a of the left detection bar 11 to be capable of freely rotating; the middle of the support part 20 is provided with an assorted part 20b to interact with a second slotted hole 11e on the left detection bar 11, and here the assorted part 20b adopts a salient point; the salient point is embedded in the second slotted hole 11e and can move in the second slotted hole. While being at the initial state, the position where the support part 20 locates on the upper base plate 2 approximately coincides with the position where the detection bar 11 cooperating with the support part 20 locates on the upper base plate 2. The middle of the trigger bar 21 is rotatably fixed to a second short axis 20c of the free end of the support part 20; one end of the trigger bar is provided with a contact part 21a for contacting the periphery of an optical disk, and the other end is provided with a contact pin 21b contacting the end face of the circular-arc groove 40f of the cam unit 40. Under the action of the spring force (the spring is not shown in the figure), the trigger bar 21 gives the second short axis 20c a rotating force towards the center, to push the contact pin 21b towards the end face of the circular-arc groove 40f of the cam unit 40.

The trigger bar 21 is a part of L shape, and its curved part is fixed to the second short axis 20c of the free end of the support part 20.

Figure 7:
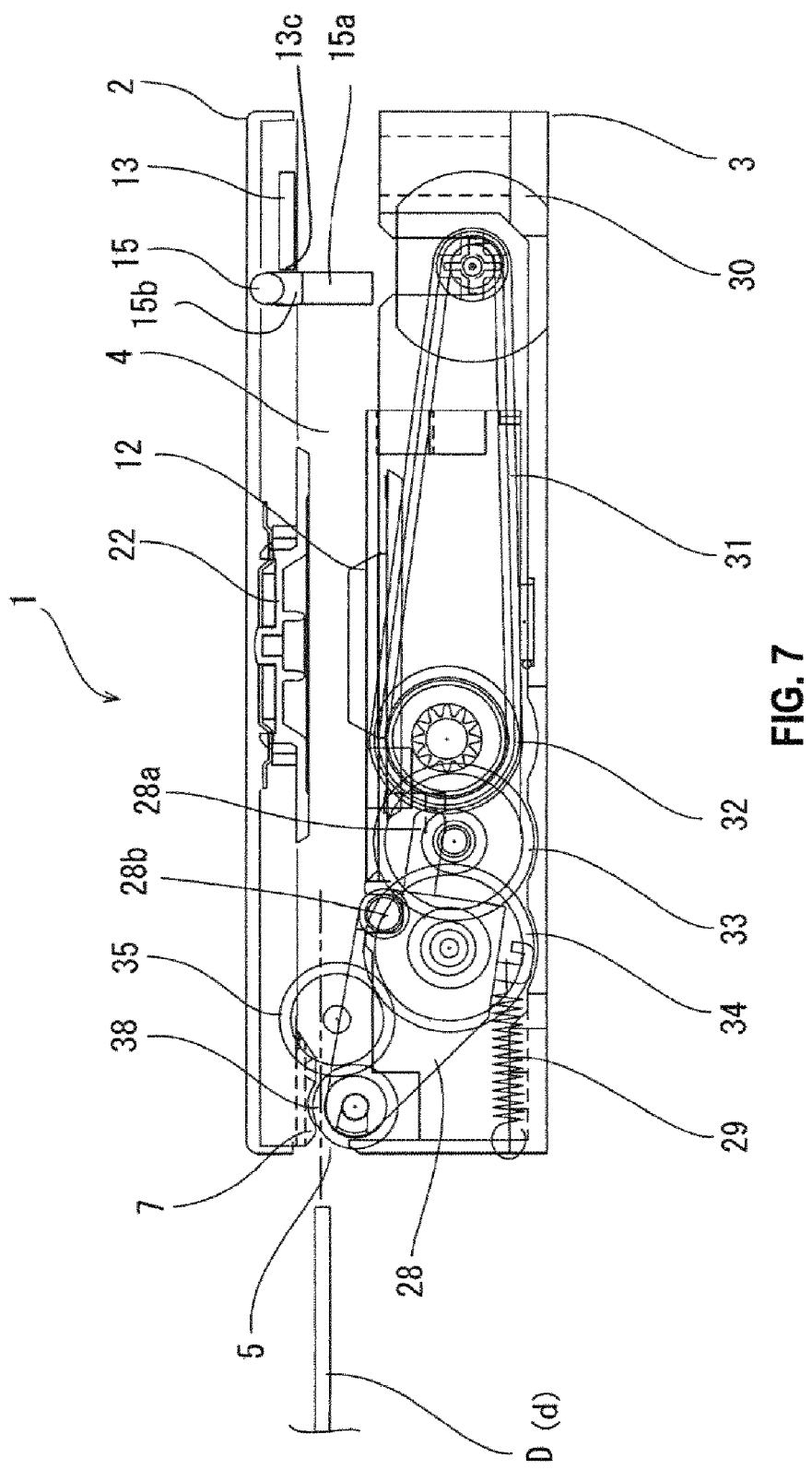
FIG. 7 is a sectional view of the optical disk player of the present invention, which is perpendicular to the optical disk transport path.
Figure 8:
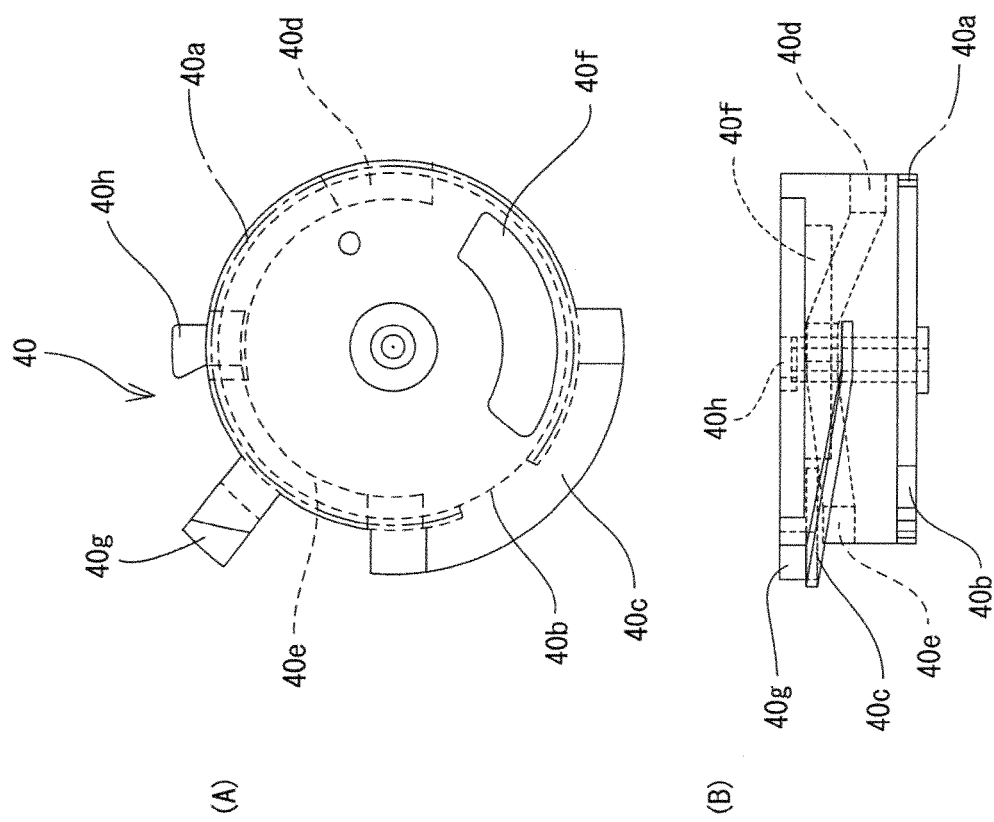
FIG. 8A, FIG. 8B are separately top view and side view of the cam unit.

Referring to FIG. 1 and FIG. 7, the transport mechanism comprises the delivery roll 27 and an optical disk guiding device 7; the optical disk guiding device 7 is located at the optical disk insertion inlet 5 of the shell, and the delivery roll 27 is located at the position of the optical disk insertion inlet 5 to be opposite to the optical disk guiding device 7; the roll support plate of the delivery roll 27 is fixed on the lower base plate 3 via a shaft 28b; a second stretching spring 29 for making the roll support plate 28 to move towards the optical disk guiding device 7 is located between the roll support plate 28 and the lower base plate 3. Under the action of the force of the second stretching spring 29, the roll support plate 28 pushes the delivery roll 27 towards the optical disk guiding device 7. If the optical disk is inserted along the middle of the delivery roll 27 and the optical disk guiding device 7, the roll support plate 28 will rotate under the state of resist the second stretching spring 29, so as to make the optical disk capable of entering from between the delivery roll 27 and the optical disk guiding device 7. Moreover, the roll support plate 28 is provided with a third slide contact part 28a capable of cooperating with a third flange 40e of the cam unit 40 (namely the control part 40) as shown in FIG. 8. If the cam unit 40 rotates from the initial position, the third flange 40e will make the delivery roll 27 to depart from the optical disk guiding device 7 for a vast scale. The structure of the delivery roll 27 is a bipyramidal structure with the diameter gradually increasing from the middle to the two ends. The shaft 28b of the roll support plate 28 is located between the delivery roll 27 and the plummer 12.

The lower base plate 3 is provided with a motor 30, and a decelerating mechanism which decelerates the motor 30 and transports the power to the delivery roll 27 and the cam unit 40. The decelerating mechanism comprises a belt pulley 32 decelerating and transporting the rotating of the motor via a belt 31, a first gear 33 decelerating the belt pulley 32 and transporting its power, a second gear 34 decelerating the first gear 33 and transporting its power, a third gear 35 transporting the rotating via the second gear 34, a worm gear 36 fixed to the plane of the lower base plate 3 and corresponding to the gear ring 40a of the cam unit 40, and a worm cooperating with the worm gear 36; the periphery of the worm gear 36 is provided with a gear ring for cooperating with the gear ring 40a of the cam unit 40 to drive the cam unit 40 to rotate, and the second gear 34 is fixed at one end of the worm. The motor 30, the belt pulley 32 and the first gear 33 are fixed at the side of the lower base plate 3; the second gear 34 and the third gear 35 are fixed at a gear plate 37, and the gear plate 37 is fixed at the side of the lower base plate 3. The gear ring 40a of the cam unit 40 is provided with a gap 40b; when the cam unit 40 is located at the initial position, the gap 40b is opposite to the worm gear 36. The third gear 35 meshes with a roll gear 38; the roll gear 38 and the delivery roll 27 rotate as one body.

Referring to FIG. 8A, FIG. 8b and FIG. 1, the control part 40 is fixed to the lower base plate 3, and it is a cam unit capable of rotating freely around its shaft; the cam unit is provided with:

a gear ring 40a located at an edge position of the periphery of the cam unit, the gear ring 40a being provided with a gap 40b;

a first flange 40c located at the periphery of the cam unit, for controlling the chuck plate 22 to approach or be away from the optical disk transport path;

a second flange 40d located at the periphery of the cam unit, for controlling the plummer 12 to approach or be away from the optical disk transport path;

a third flange 40e located at the periphery of the cam unit, for controlling the roll support plate 28 to rotate to make the delivery roll 27 to approach or be away from the optical disk guiding device 7;

a circular-arc groove 40f located at the end part of the cam unit, for connecting the trigger bar 21;

a second salience 40h located at the periphery of the cam unit, for stirring the detection bar 11 to rotate to release the contact of the detection parts 10a, 11a and the periphery of a small diameter optical disk; and a third salience 40g located at the periphery of the cam unit, for stirring the detection bar 11 to rotate to release the contact of the detection parts 10a, 11a and the periphery of a big diameter optical disk.

Wherein, the first flange 40c extrudes out of the periphery of the cam unit 40; the second flange 40d and the third flange 40e sink into the peripheral surface. The second salience 40h and the third salience 40g are near the rotating end point of the cam; if a small diameter optical disk is inserted, when the rotary displacement of the foot part 11d of the left detection bar 11 is comparatively small, the second salience 40h will contact the foot part 11d; If a big diameter optical disk is inserted, when the left detection bar 11 is made to rotate for a vast scale, the third salience 40g will contact the foot part 11d. For the second salience 40h and the third salience 40g contacting and pressing the foot part 11d, the left detection bar 11 will rotate counterclockwise to release the contact of the detection part 11a and the periphery of the optical disk; at the same time, the rotating of the left detection bar 11 is transported to the right detection bar 10 via the linkage plate 13, so as to release the contact of the detection part 10a of the right detection bar 10 and the periphery of the optical disk.

Referring to FIG. 5, the upper base plate 2 is provided with a hold plate 23 to hold the chuck plate 22. One end of the hold plate 23 is provided with the chuck plate 22; the other end is provided with the first slide contact part 23a cooperating with the first flange 40c of the cam unit 40; the middle part is provided with a connecting part 23b; the hold plate 23 is connected to the upper base plate 2 via the connecting part 23b, and can freely rotate around the connecting part 23b. Moreover, the end part of one side of the hold plate 23 is provided with a hold plate elastic trip 24 pushing the center of the chuck plate 22 towards the plummer 12. A spring (the spring is not shown in the figure) is fixed between the hold plate 23 and the upper base plate 2; the spring can make the hold plate 23 to rotate, so as to make the chuck plate 22 to endure the force of separating from the plummer 12; If the cam unit 40 rotates from the initial position, the first flange 40c will endure the force of the spring to make the hold plate 23 to rotate, further to connect the chuck plate 22 and the plummer 12 by compression joint.

An optical disk signal pickup device and the plummer 12 integrally compose the rotating mechanism 25 for playing an optical disk, which is fixed to a PU base plate 26 via a shockproof elastic part 25a; one end of the PU base plate 26 is fixed to the lower base plate 3 via a shaft 26a, and the other end is provided with a second slide contact part 26b for cooperating with the second flange 40d of the cam unit 40. When the cam unit 40 is at the initial position, the second flange 40d makes the end of the PU base plate 26 to approach the lower base plate 3, so as to make the plummer 12 to be far away from the optical disk transport path 4 (as shown in FIG. 5); and when the cam unit 40 is located at the rotating terminal end, the second flange 40d can make the plummer 12 to be in the optical disk transport path 4 (as shown in FIG. 6).

Figure 9:
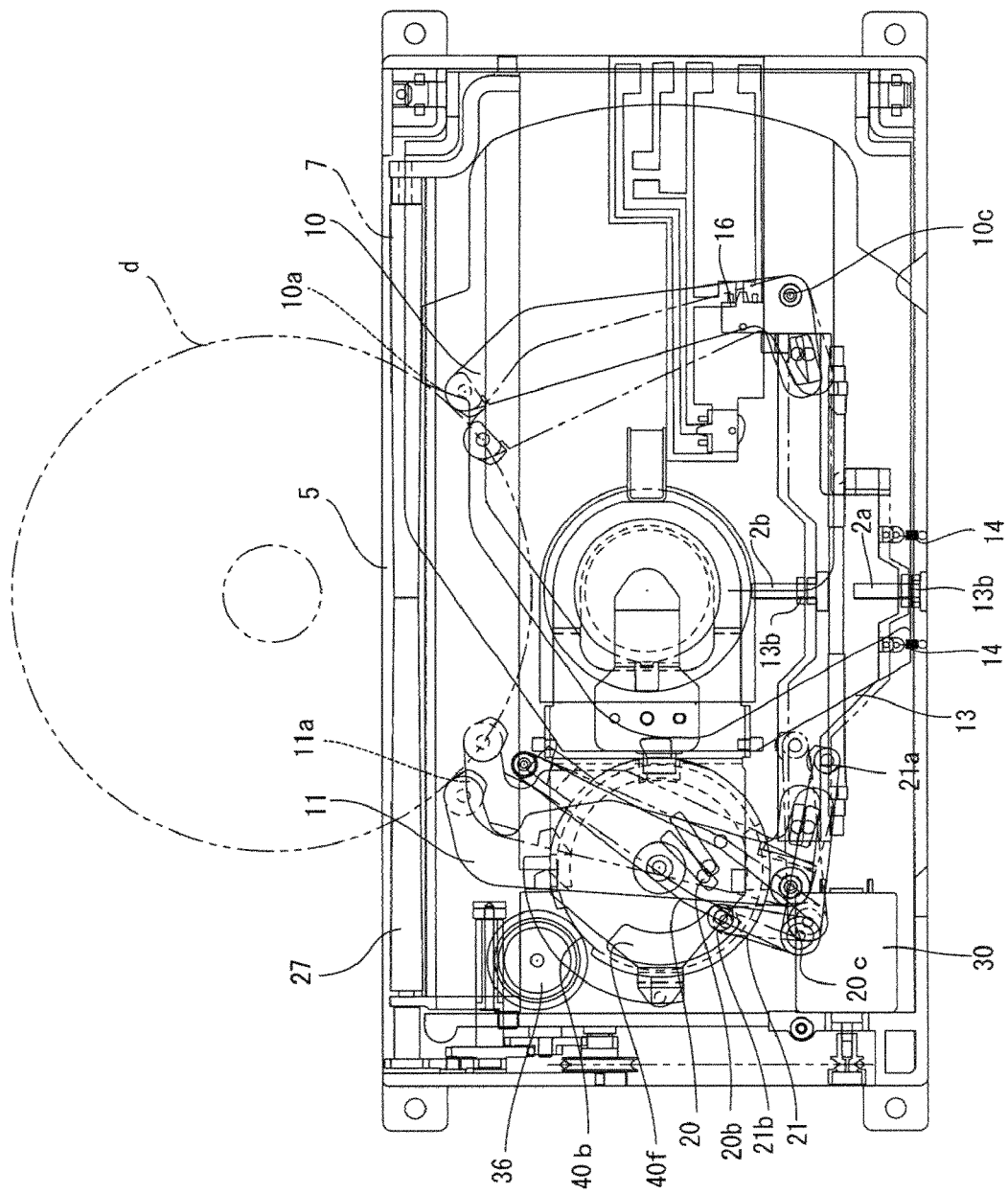
FIG. 9 is a state diagram of transporting a small diameter optical disk, which shows the state of the small diameter optical disk d being inserted from between the optical disk guiding device and the delivery roll of the insertion inlet.

Description to the Actions:

FIG. 9 shows the situation that the small diameter optical disk d resists the force of the second stretching spring 29, to be inserted from between the optical disk guiding device 7 and the delivery roll 27 of the insertion inlet 5. At this time, the periphery of the small diameter optical disk d pushes the detection parts 10a, 11a of the two detection bars 10, 11, so as to make the two detection bars to move from the position as shown with the imaginary line (broken line) to the position as shown with the real line. The rotating of the two detection bars 10, 11 makes the linkage plate 13 to move from the position as shown with the imaginary line (broken line) to upwards. The moving of the linkage plate 13 makes the first switch 16 to be closed, so as to start the motor 30. The motor 30 via the decelerating mechanism drives the delivery roll 27 to rotate, and the small diameter optical disk d is transported into the optical disk transport path 4 by the rotating of the delivery roll 27. At this time, the gap 40b of the cam unit and the worm gear 36 are located at corresponding positions, so, the rotating of the worm gear 36 will not make the cam unit 40 to rotate. Then, on the one hand, the small diameter optical disk d pushes the two detection bars 10, 11 to rotate, on the other hand, it is guided in to the optical disk transport path.

If the small diameter optical disk is not aimed to the central position of the optical disk insertion inlet 5 while it is inserted, one of the two detection bars 10, 11 will only rotate for a little, and the first switch 16 is closed, so, the small diameter optical disk d is transported into the optical disk transport path 4 by the rotating of the delivery roll 27. After that, for the contact of the step parts 2c and the embedding parts 13b, the rotating of one side of the two detection bars 10, 11 is limited. So, the small diameter optical disk d will be guided by the detection parts of the side with the rotating being limited, via the rotating of the delivery roll 27, to be transported into the optical disk transport path 4 near the central line 1a.

By the rotating of the left detection bar 11, the second slotted hole 11e via the assorted part 20b makes the support part 20 to rotate clockwise as shown in the figure. For the support part 20 is fixed according to the direction that makes the connecting line between the first short axis 20a and the second short axis 20c to be juxtaposed to the central line 1a, the trigger bar 21 that is supported by the rotating front end of the support part 20 will move along the direction directly facing the central line 1a. So, by the way of making the trigger bar 21 to move towards the direction directly facing the central line 1a, in the present invention, the dimension of the shell of the optical disk player at the optical disk transport direction can be effectively controlled.

Figure 10:
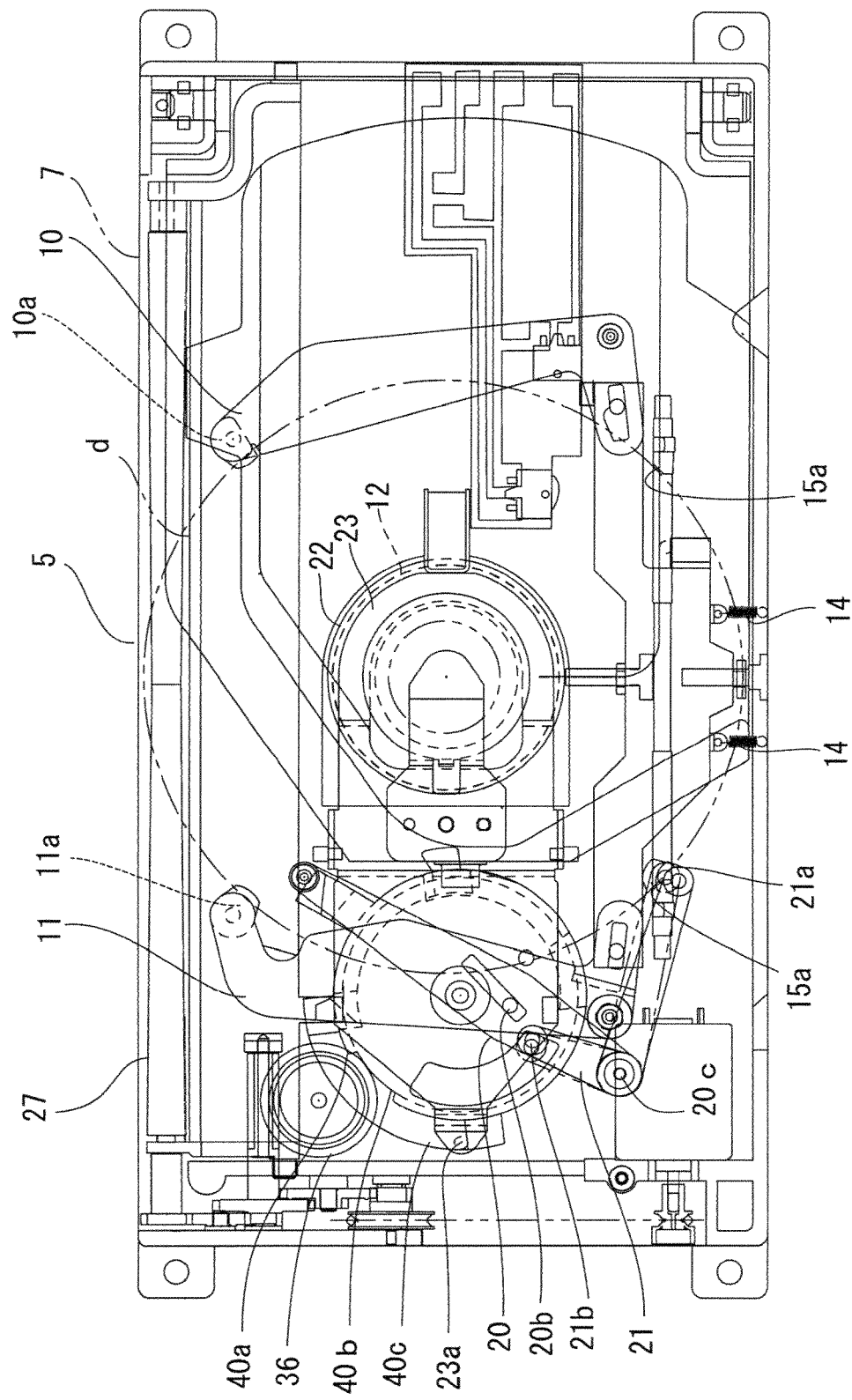
FIG. 10 is a state diagram of transporting a small diameter optical disk, which shows the state of the periphery of the small diameter optical disk d contacting the baffle part when the center of the small diameter optical disk d is located at the position just passing the center of the plummer a little.

FIG. 10 shows the situation that when the center of the small diameter optical disk d passes the center of the plummer 12 a little, the periphery of the small diameter optical disk d contacts the baffle part 15a. At this time, the contact part 21a of the trigger bar 21 is against the periphery of the small diameter optical disk d, and the contact pin 21b of the trigger bar 21 moves from the position of the imaginary line to the position as shown with the real line near the center. By the rotating of the trigger bar 21, the contact pin 21b of the trigger bar 21 pushes the circular-arc groove 40f of the cam unit 40, so as to make the cam unit 40 to rotate counterclockwise. By the rotating of the cam unit 40, the gear ring 40a of the cam unit 40 meshes with the worm gear 36. The motor 30 via the worm gear 36 makes the cam unit 40 to rotate counterclockwise. By the rotating of the cam unit 40, the first flange 40c will via the hold plate 23 make the chuck plate 22 to approach the plummer 12. Then, the hold plate elastic trip 24 fixed to the hold plate 23 via the chuck plate 22 pushes the small diameter optical disk d towards the plummer 12.

On the other hand, the second flange 40d of the cam unit 40 via the second slide contact part 26b of the PU base plate 26 makes the PU base plate 26 to rotate around the shaft 26a. With this rotating, the PU base plate 26 raises the rotating mechanism 25, so as to make the plummer 12 to approach the small diameter optical disk d; the plummer 12 and the chuck plate 22 together holds the small diameter optical disk, so as to make it possible to play the optical disk. On the surface of the plummer 12 opposite to the chuck plate 22, a tapered salience 12a cooperating with the central hole of the small diameter optical disk d is provided; after the salience 12a is embedded to the central hole of the small diameter optical disk d, the contact of the periphery of the small diameter optical disk and the baffle part 15a is released.

Furthermore, referring to FIG. 7, by the rotating of the cam unit, the third flange 40e of the cam unit 40, under the situation of resisting the second stretching spring 29, makes the roll support plate 28 to rotate counterclockwise around the shaft 28b. By the roll support plate 28 rotating counterclockwise, the small diameter optical disk d and the delivery roll 27 together move towards the lower base plate 3, and the small diameter optical disk d is descended to the plummer 12. Then, by the roll support plate 28 rotating counterclockwise, the tapered delivery roll 27 departs from the small diameter optical disk d, to move to the position that will not hinder the rotating of the optical disk. On the other hand, since the small diameter optical disk descends to the plummer 12, it also departs from the optical disk guiding device 7.

Furthermore, when the cam unit 40 is at the counterclockwise rotating terminal end, the second salience 40h of the cam unit 40 contacts the foot part 11d of the left detection bar 11, so as to make the left detection bar 11 to rotate counterclockwise as shown in FIG. 10. By this rotating, the left detection bar 11 makes the detection part 11a to depart from the periphery of the small diameter optical disk. Besides, as shown in FIG. 10, via the linkage plate 13, the right detection bar 10 that moves together with the left detection bar 11 rotates clockwise, so as to make the detection part 10a to depart from the periphery of the small diameter optical disk. That is, after the small diameter optical disk d is inserted from the optical disk insertion inlet 5, it is transported to the plummer 12, and then it is held by the chuck plate 22; in this period, the detection parts 10a, 11a keep guiding the periphery of the optical disk. By this guiding, no matter what posture the optical disk player of the present invention is at, it can all transport the small diameter optical disk d to the plummer 12 safely. Besides, in the operation of getting the optical disk out, the above mentioned actions will be executed conversely. So, only after the small diameter optical disk d is held by the two detection parts 10a, 11a, the holding of the chuck plate 22 and the plummer 12 to the optical disk is released; even if the direction of the optical disk insertion inlet 5 is downward, the small diameter optical disk can still be prevented from dropping out of the optical disk insertion inlet 5.

Figure 11:
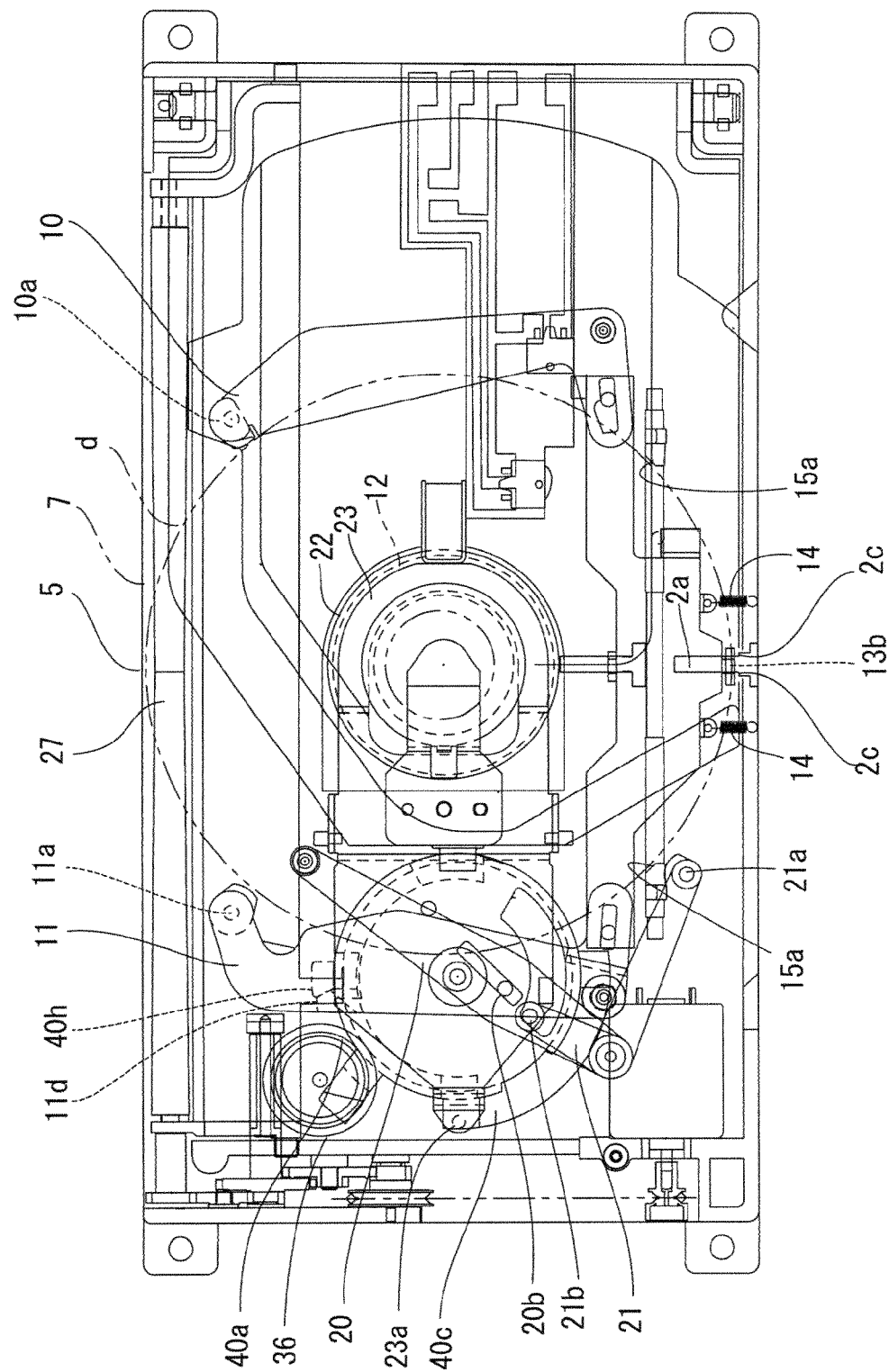
FIG. 11 is a state diagram of transporting a small diameter optical disk, which shows the state of the small diameter optical disk d being kept on the plummer to be in the state capable of being played.

FIG. 11 shows that the small diameter optical disk d is kept on the plummer 12 to be at the state capable of being played. At this time, the cam unit 40 is located at the position of rotating terminal end; the detection parts 10a, 11a and the baffle part 15a are at the state of not contacting the periphery of the small diameter optical disk d; the optical disk guiding device 7 and the delivery roll 27 are also at the state of not contacting the surface of the optical disk. By the action of the second salience 40h of the cam unit 40, the left detection bar 11 endures a rotating force towards counterclockwise direction, and the linkage plate 13 only moves slightly. For the slightly moving of the linkage plate 13, the embedding parts 13b via the step parts 2c move towards the inner of the first guiding hole 2a. So, while getting the optical disk out, the small diameter optical disk d is transported out under the holding of the delivery roll 27 and the optical disk guiding device 7; for the embedding parts 13b don't contact the step parts 2c, the action of getting out is very smooth.

Figure 12:
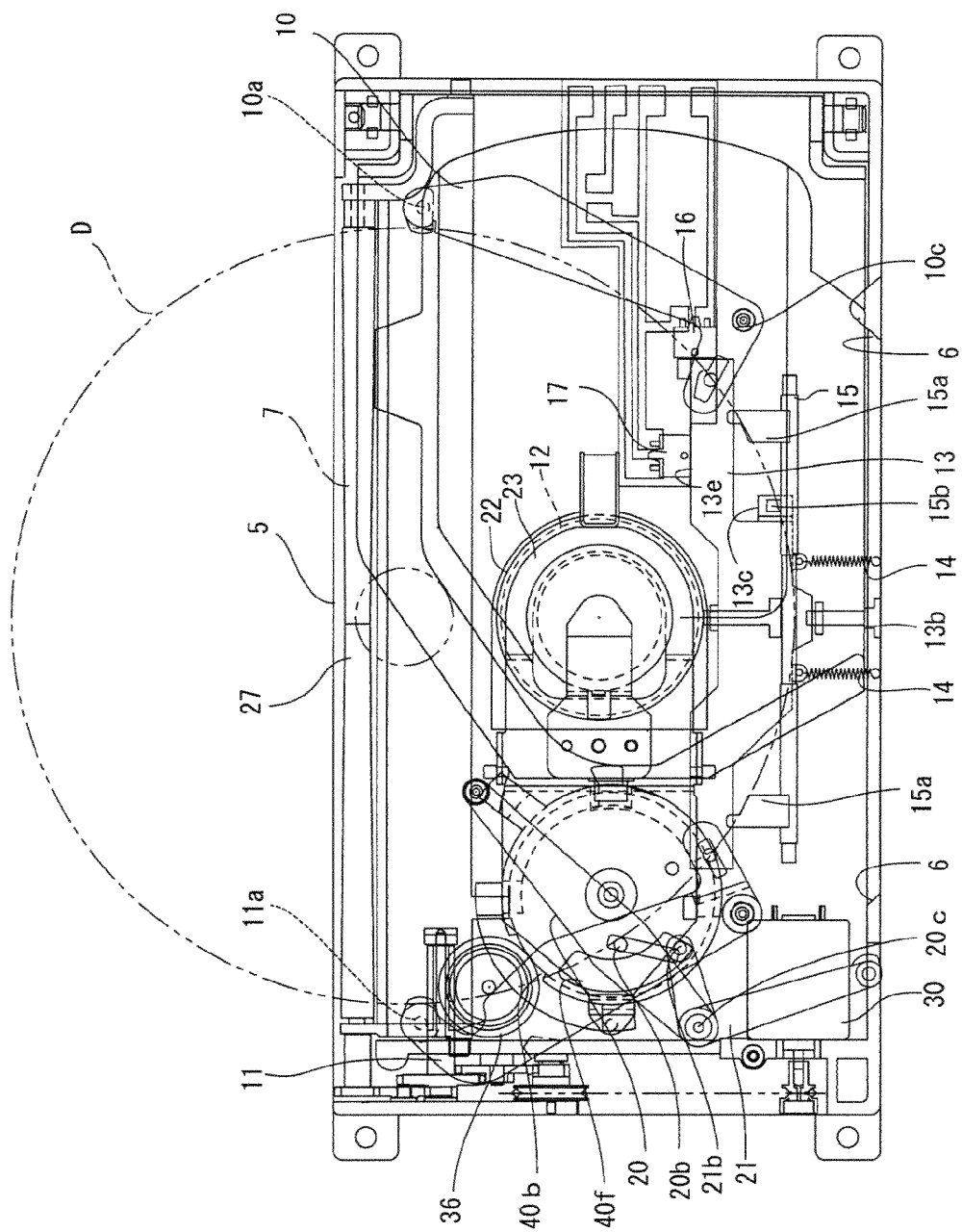
FIG. 12 is a state diagram of transporting a big diameter optical disk, which shows the state of the big diameter optical disk D being inserted from the insertion inlet, and the rotary displacement of the left and right detection bars getting to the maximum.

FIG. 12 shows the state that when the big diameter optical disk D is inserted from the insertion inlet, the rotary displacement of the two detection bars 10, 11 gets to the maximum. By the rotating of the left detection bar 11, the second slotted hole 11e via the assorted part 20b makes the support part 20 to rotate clockwise as shown in the figure to the utmost. The trigger bar 21 fixed to the rotating front end of the support bar 20 moves towards the direction directly facing the central line 1a for the maximum range. So, for the trigger bar 21 moves towards the direction directly facing the central line 1a, even if the rotating of the left detection bar 11 gets to the utmost, the increasing of the dimension of the main unit at the optical disk transport direction can still be restrained. During the course of the rotating of the two detection bars 10, 11 getting to the maximum range, the first pushing part 13c of the linkage plate 13 pushes the pushed part 15b of the optical disk baffle 15, as shown in FIG. 15, so as to make the baffle part 15a of the optical disk baffle 15 to exit from the optical disk transport path 4. So, the big diameter optical disk can be transported under the situation of not contacting the baffle part 15a of the optical disk baffle 15.

Figure 13:
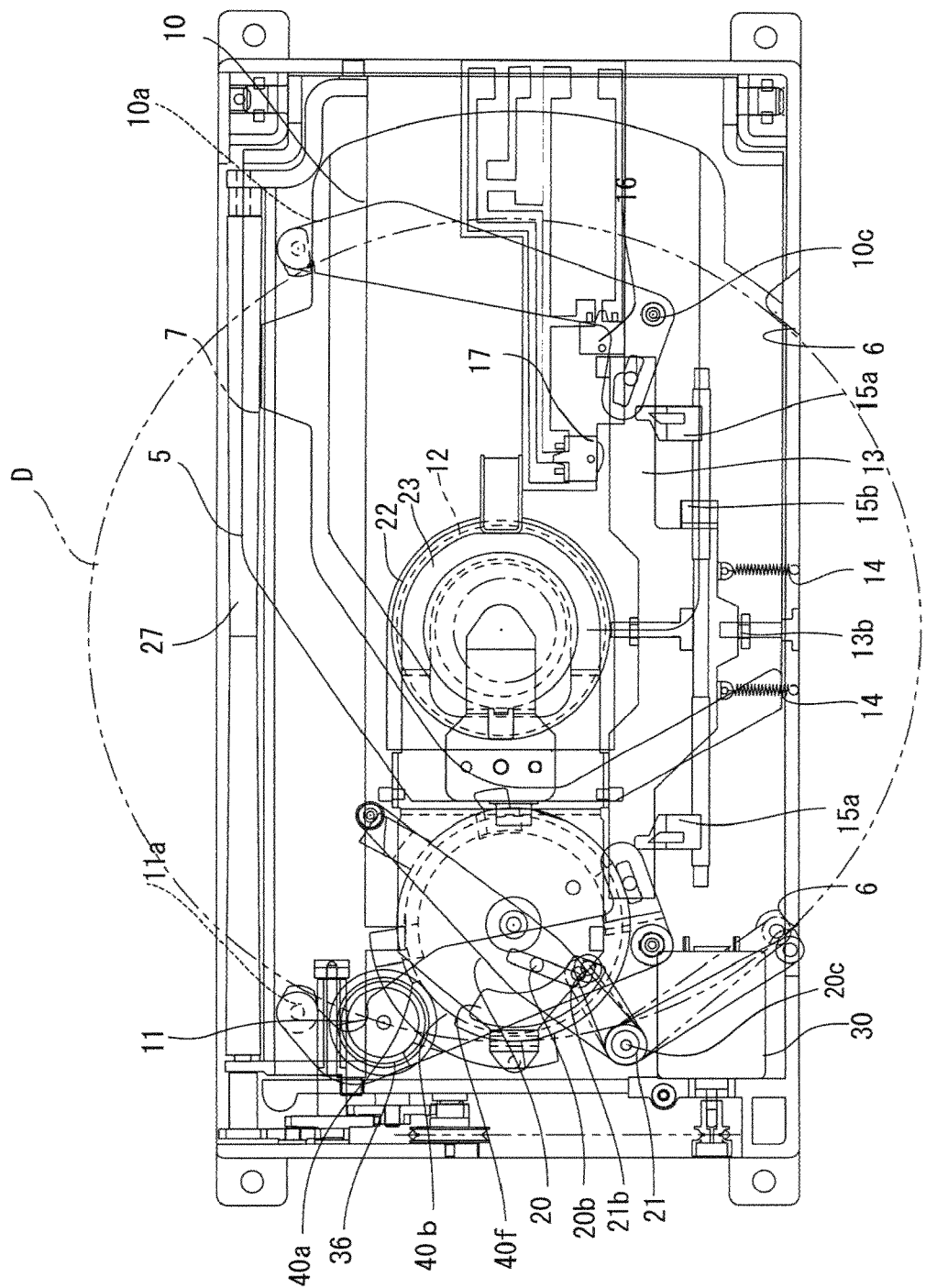
FIG. 13 is a state diagram of transporting a big diameter optical disk, which shows the state of the periphery of the big diameter optical disk D contacting the baffle 6 when the center of the big diameter optical disk is located at the position just passing the center of the plummer a little.

FIG. 13 shows the state that the big diameter optical disk D contacts the baffle 6 to stop the transport action; the center of the big diameter optical disk is located at the position just passing the center of the plummer a little; at this time, the contact part 21a of the trigger bar 21 is pushed towards the periphery of the big diameter optical disk D, and the trigger bar 21 will rotate around the second short axis 20c from the position of the imaginary line (broken line) to the position of the real line. By the rotating of the trigger bar 21, the contact pin 21b of the trigger bar 21 pushes the end face of the circular-arc groove 40f of the cam unit 40, so as to make the cam unit 40 to rotate counterclockwise. By the rotating of the cam unit 40, the gear ring 40a of the cam unit 40 meshes with the worm gear 36, so as to make the rotating of the motor 30 to be transported to the cam unit 40.

Figure 14:
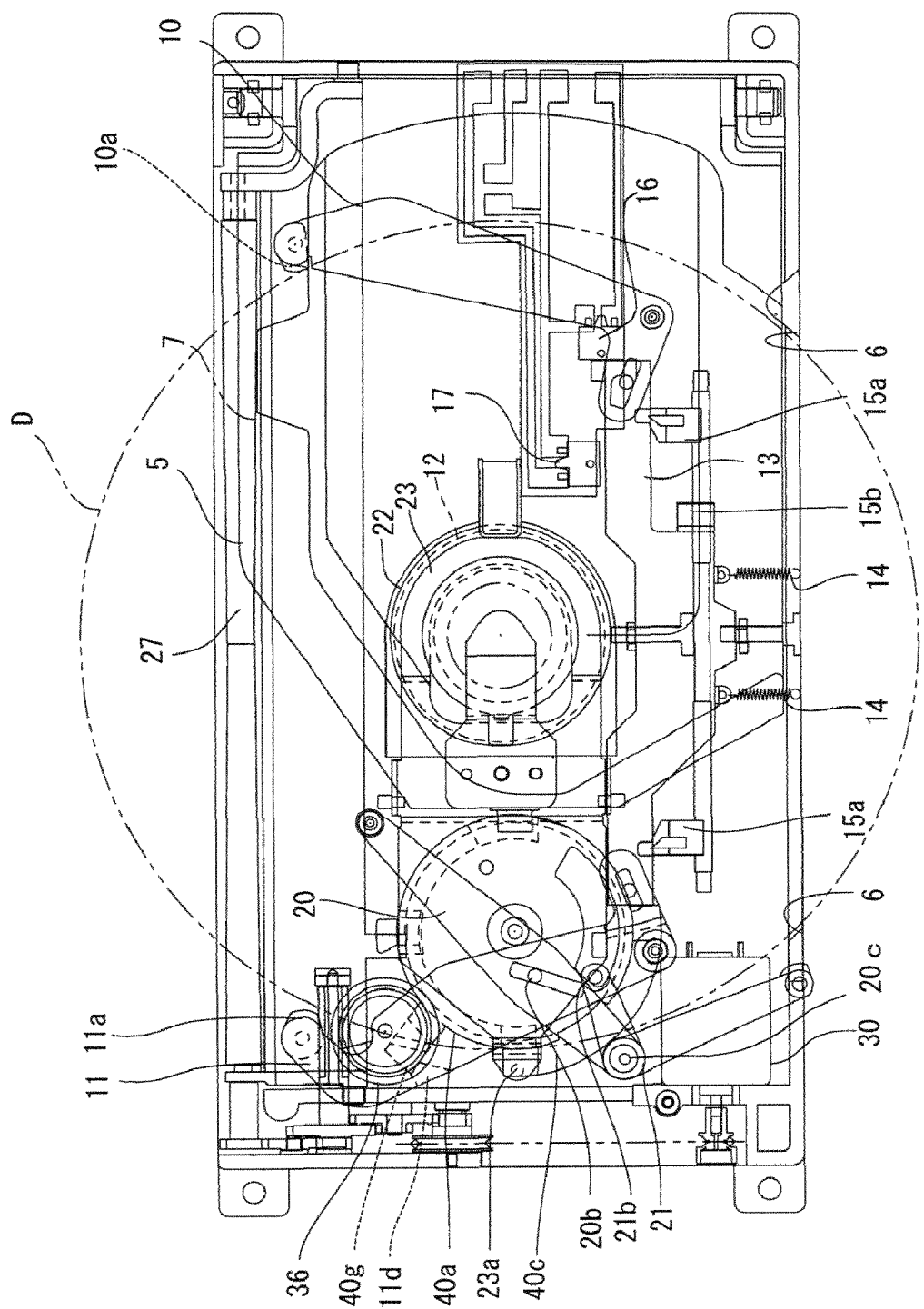
FIG. 14 is a state diagram of transporting a big diameter optical disk, which shows the state of the big diameter optical disk D being kept on the plummer to be in the state capable of being played.

When the cam unit 40 is at the counterclockwise rotating terminal end, the third salience 40g contacts the foot part 11d of the left detection bar 11, so as to make the left detection bar 11 to rotate counterclockwise as shown in FIG. 14. By this rotating, the detection part 11a of the left detection bar 11 departs from the periphery of the big diameter optical disk Dothan, the optical disk D is kept on the plummer 12 by the chuck plate 22. For the big diameter optical disk D makes the two detection bars 10, 11 to rotate for a vast scale, the movement amount of the linkage plate 13 is also increased; the result is that the third pushing part 13e makes the second switch 17 to act to be at the connected state. After the second switch 17 is at the connected state, a signal will be sent out to show that the optical disk inserted is a big diameter optical disk.

FIG. 14 shows that the big diameter optical disk D is located on the plummer 12 to be at the state capable of being played. At this time, the cam unit 40 is located at the position of the rotating terminal end; the two detection bars 10, 11 and the baffle 6 are at the state of not contacting the periphery of the big diameter optical disk D; besides, the optical disk guiding device 7 and the delivery roll 27 are also at the state of not contacting the surface of the optical disk, so the optical disk is possible to be played.

The present invention can be applied to optical disk players, such as of CD, DVD. The upper and the lower base plates can be made as 80-90 millimeters wide at the optical disk insertion direction.

What is claimed is:

1. An optical disk player capable of monitoring the optical disk status comprising: a shell (1), a plummer (12) fixed in the shell, a transport mechanism for transporting the optical disk between the optical disk insertion inlet (5) and the plummer (12), a guiding mechanism for guiding the optical disk to the center of the transport path, an optical disk loading final position detection mechanism, and a control part (40) for controlling a chuck plate (22) to keep the optical disk on the plummer (12) and canceling the holding of the transport mechanism to the optical disk when an optical disk being transported to be above the plummer, characterized in that:

the shell (1) is composed of an upper base plate (2) and a lower base plate (3), and a clearance (4) used as the optical disk transport path is located between the upper base plate (2) and the lower base plate (3); one end of the clearance (4) is the optical disk insertion inlet (5), and the upper and the lower base plates are 80-90 millimeters wide at the optical disk insertion direction;

the guiding mechanism comprises a pair of detection bars (10, 11) that are symmetrically located at the two sides of the central line (1a) of the optical disk transport path and capable of rotating around respective rotary pivots, a linkage plate (13) for making the pair of detection bars (10, 11) to move together, and a first stretching spring (14) making the detection bars (10, 11) to rotate according to the direction that makes their detection parts (10a, 11a) to contact the periphery of the optical disk, wherein, the detection parts (10a, 11a) of the pair of detection bars are located between the plummer (12) and a delivery roll (27) of the transport mechanism;

the optical disk loading final position detection mechanism comprises a support part (20) and a trigger bar (21); one end of the support part (20) is rotatably fixed to the upper base plate (2) near the detection part (11a) of one detection bar (11), and its middle is provided with an assorted part (20b) interacting with the detection bar (11); the middle of the trigger bar (21) is rotatably fixed to the free end of the support part (20), of which one end is provided with a contact part (21a) for contacting the periphery of the optical disk, and the other end is connected to the control part (40).

2. The optical disk player of claim 1, characterized in that at the initial state, the position where the support part (20) locates on the upper base plate (2) approximately coincides with the position where the detection bar (11) cooperating with the support part (20) locates on the upper base plate (2).

3. The optical disk player of claim 1, characterized in that the assorted part (20b) of the support part (20) is a salient point; the corresponding detection bar (11) is provided with a second slotted hole (11e); the salient point is embedded in the second slotted hole (11e) and can move in the second slotted hole.

4. The optical disk player of claim 1, characterized in that the trigger bar (21) of the optical disk loading final position detection mechanism is a part of L shape, and its curved part is fixed to the free end of the support part (20).

5. The optical disk player of claim 4, characterized in that at the initial state, the position where the support part (20) locates on the upper base plate (2) approximately coincides with the position where the detection bar (11) cooperating with the support part (20) locates on the upper base plate (2).

6. The optical disk player of claim 1, characterized in that the transport mechanism comprises the delivery roll (27) and an optical disk guiding device (7); the optical disk guiding device (7) is located at the optical disk insertion inlet (5) of the shell (1), and the delivery roll (27) is located at the position of the optical disk insertion inlet (5) to be opposite to the optical disk guiding device (7); a roll support plate (28) of the delivery roll (27) is fixed on the lower base plate (3) via a shaft (28*b*); a second stretching spring (29) for making the roll support plate (28) to move towards the optical disk guiding device (7) is located between the roll support plate (28) and the lower base plate (3).

7. The optical disk player of claim 6, characterized in that at the initial state, the position where the support part (20) locates on the upper base plate (2) approximately coincides with the position where the detection bar (11) cooperating with the support part (20) locates on the upper base plate (2).

8. The optical disk player of claim 6, characterized in that the assorted part (20*b*) of the support part (20) is a salient point; the corresponding detection bar (11) is provided with a second slotted hole (11*e*); the salient point is embedded in the second slotted hole (11*e*) and can move in the second slotted hole.

9. The optical disk player of claim 6, characterized in that the trigger bar (21) of the optical disk loading final position detection mechanism is a part of L shape, and its curved part is fixed to the free end of the support part (20).

10. The optical disk player of claim 9, characterized in that the assorted part (20*b*) of the support part (20) is a salient point; the corresponding detection bar (11) is provided with a second slotted hole (11*e*); the salient point is embedded in the second slotted hole (11*e*) and can move in the second slotted hole.

11. The optical disk player of claim 6 characterized in that the shaft (28*b*) of the roll support plate (28) is located between the delivery roll (27) and the plummer (12).

12. The optical disk player of claim 11, characterized in that at the initial state, the position where the support part (20) locates on the upper base plate (2) approximately coincides with the position where the detection bar (11) cooperating with the support part (20) locates on the upper base plate (2).

13. The optical disk player of claim 11, characterized in that the assorted part (20*b*) of the support part (20) is a salient point; the corresponding detection bar (11) is provided with a second slotted hole (11*e*); the salient point is embedded in the second slotted hole (11*e*) and can move in the second slotted hole.

14. The optical disk player of claim 11, characterized in that the trigger bar (21) of the optical disk loading final position detection mechanism is a part of L shape, and its curved part is fixed to the free end of the support part (20).

15. The optical disk player of claim 14, characterized in that at the initial state, the position where the support part (20) locates on the upper base plate (2) approximately coincides with the position where the detection bar (11) cooperating with the support part (20) locates on the upper base plate (2).

16. The optical disk player of claim 6, characterized in that the control part (40) is fixed to the lower base plate (3), which is a cam unit capable of rotating freely around its shaft, and the cam unit is provided with:
- a gear ring (40*a*) located at an edge position of the periphery of the cam unit, the gear ring (40*a*) being provided with a gap (40*b*);
- a first flange (40*c*) located at the periphery of the cam unit, for controlling the chuck plate (22) to approach or be away from the optical disk transport path;
- a second flange (40*d*) located at the periphery of the cam unit, for controlling the plummer (12) to approach or be away from the optical disk transport path;
- a third flange (40*e*) located at the periphery of the cam unit, for controlling the roll support plate (28) to rotate to make the delivery roll (27) to approach or be away from the optical disk guiding device (7);
- a circular-arc groove (40*f*) located at the end part of the cam unit, being used to connect the trigger bar (21);
- a second salience (40*h*) located at the periphery of the cam unit, being used to stir the detection bar (11) to rotate to release the contact of the detection parts (10*a*, 11*a*) and the periphery of a small diameter optical disk; and
- a third salience (40*g*) located at the periphery of the cam unit, being used to stir the detection bar (11) to rotate to release the contact of the detection parts (10*a*, 11*a*) and the periphery of a big diameter optical disk.

17. The optical disk player of claim 16, characterized in that at the initial state, the position where the support part (20) locates on the upper base plate (2) approximately coincides with the position where the detection bar (11) cooperating with the support part (20) locates on the upper base plate (2).

18. The optical disk player of claim 16, characterized in that the assorted part (20*b*) of the support part (20) is a salient point; the corresponding detection bar (11) is provided with a second slotted hole (11*e*); the salient point is embedded in the second slotted hole (11*e*) and can move in the second slotted hole.

19. The optical disk player of claim 16, characterized in that the trigger bar (21) of the optical disk loading final position detection mechanism is a part of L shape, and its curved part is fixed to the free end of the support part (20).

20. The optical disk player of claim 16, characterized in that an optical disk signal pickup device and the plummer (12) are formed as one body, and are fixed to a PU base plate (26) via a shockproof elastic part (25*a*); one end of the PU base plate (26) is fixed to the lower base plate (3) via a shaft (26*a*), and the other end is provided with a second slide contact part (26*b*) for cooperating with the second flange (40*d*) of the cam unit.

* * * * *